United States Patent [19]

Miffre

[11] 4,029,289
[45] June 14, 1977

[54] CONTROL SYSTEM FOR GATE-VALVES

[75] Inventor: Hubert Miffre, Elancourt, France

[73] Assignee: Institute Francais du Petrole, des Carburants et Lubrifiants et Entreprise de Recherches et d'Activities Elf, Paris, France

[22] Filed: Dec. 11, 1974

[21] Appl. No.: 531,782

[30] Foreign Application Priority Data

Dec. 11, 1973  France ............................ 73.44113

[52] U.S. Cl. ................................... 251/58; 92/65; 92/75; 251/279; 251/326

[51] Int. Cl.² ...................................... F16K 31/122

[58] Field of Search .................. 251/26, 31, 56, 58, 251/63.4, 213, 228, 279, 301, 303, 318, 326, 232; 92/50, 65, 69, 75; 137/625.44, 625.45, 625.48, 625.49

[56] References Cited

UNITED STATES PATENTS

| 296,944 | 4/1884 | Field ............................ 92/65 |
|---|---|---|
| 306,930 | 10/1884 | Kane ............................ 92/65 |
| 363,643 | 5/1887 | Jacobs ............................ 251/58 |
| 677,940 | 7/1901 | Carr ............................ 251/58 |
| 872,369 | 12/1907 | Rankin ............................ 92/75 |
| 1,532,029 | 3/1925 | Bobbitt ............................ 92/69 R |
| 1,819,875 | 8/1931 | Cunningham ............................ 251/58 |
| 2,004,717 | 6/1935 | Thwaits ............................ 251/279 |
| 2,042,906 | 6/1936 | McElwaine ............................ 92/50 |
| 2,358,186 | 9/1944 | Pond ............................ 251/58 |
| 2,387,912 | 10/1945 | Kelly ............................ 251/58 |
| 2,503,469 | 4/1950 | Caldwell ............................ 251/58 |
| 3,063,423 | 11/1962 | Riordan ............................ 92/65 |
| 3,684,237 | 8/1972 | Hyde et al. ............................ 251/58 |
| 3,854,500 | 12/1974 | Cooper ............................ 251/326 |

*Primary Examiner*—Martin P. Schwadron
*Assistant Examiner*—G. L. Walton
*Attorney, Agent, or Firm*—Brisebois & Kruger

[57] ABSTRACT

This invention concerns a control system for automatic safety gate-valves.

The system comprises two hydraulically controlled pistons, the rod axis of which is parallel to the axis of the valve passage, and a connection by equal connecting rods, symmetrical to the axis of the gate-rod, between each of the piston rods and the gate-rod, with a release spring exerting a force contrary to the opening force acting on each piston.

This system is specially designed for automatic gate-valves for oil installations.

5 Claims, 7 Drawing Figures

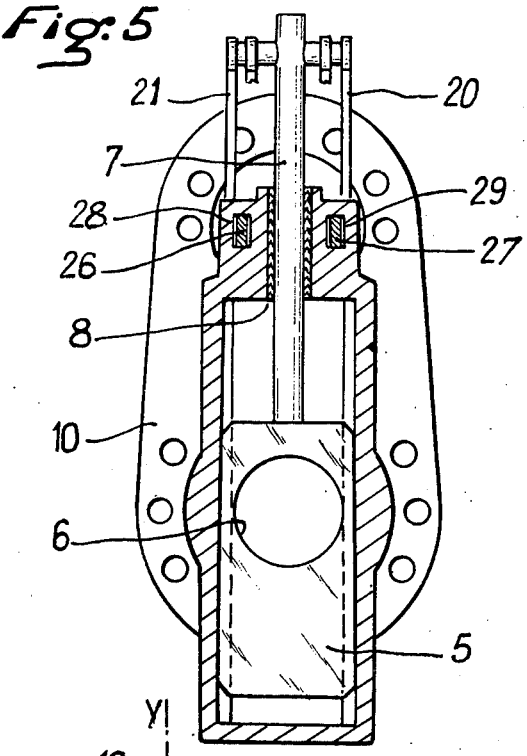
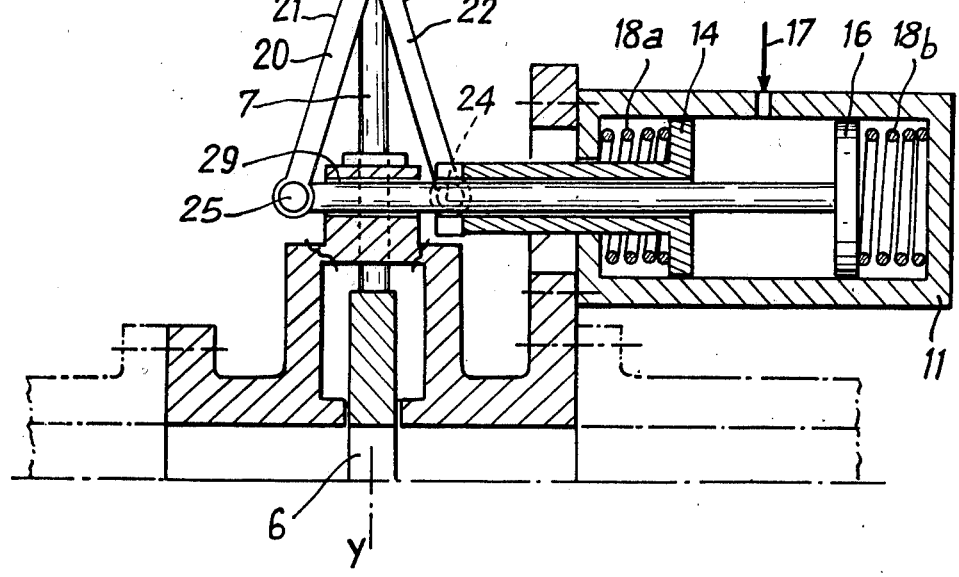

CONTROL SYSTEM FOR GATE-VALVES

This invention concerns a system for controlling a safety gate-valve, namely a valve that closes automatically when the control fluid pressure drops, the transverse dimensions of said system being comparatively small.

Various automatic safety gate-valves already exist, such as the one illustrated in FIG. 1. In such valves, the axis of the gate-member, or gate, is always aligned with the control piston rod, so that the control piston is perpendicular to the axis of the passage on which the valve is fitted. This means that such valves are very bulky, which may raise problems in certain cases, particularly when these valves are used in underwater well-heads, where such safety valves are often installed.

The instant invention overcomes the drawbacks of the known valves, by providing a control system in which the piston axis is parallel to the passage on which the valve is fitted, so that size is reduced to that required for the counter-shaft mechanism.

The system for operating automatic safety gate-valves according to the invention comprises two hydraulically controlled pistons, the rods of which are parallel to the axis of the valve passage, and means for connecting each of the piston-rods to the valve gate-rod, which are arranged in such a manner that displacement of the pistons causes longitudinal movement of the gate-rod.

In one recommended embodiment, the means by which displacement of the pistons causes longitudinal movement of the gate-rod consist of two connecting-rods or two pairs of connecting-rods of equal length, each such connecting-rod or pair of connecting-rods being hinged at one of their ends on a short axle perpendicular to the plane containing the respective axes of the gate member and the piston, this short axle being attached to the upper end of the gate-rod, and the opposite ends of the connecting-rods or pairs of connecting-rods being hinged on two axles parallel to the short axle, each of these axles being integral with the end of one of the rods of each of the two pistons, the connecting-rods or pairs of connecting-rods being at an equal angle, in opposite directions, to the gate-rod axis, the piston-rods, or bars projecting from them, being guided by slide ways provided on the valve casing on each side of the gate-rod passage.

In one embodiment, each piston forms an integral part of a hydraulic valve, dividing the cylinder of this valve into two spaces, one comprising a control-oil inlet, and the other a release spring resting on the bottom of the cylinder and on the piston.

In one advantageous embodiment, both pistons form a part of a single hydraulic jack, occupying symmetrical positions in relation to the median plane of the jack cylinder, and dividing this cylinder into three spaces, the pistons being fitted with coaxial rods protruding through the same end of the cylinder, the central space containing a release spring resting on both pistons, and the two end spaces each comprising an actuating oil inlet.

In another embodiment, both pistons form a part of a single hydraulic jack, occupying symmetrical positions in relation to the median plane of the jack cylinder and dividing the cylinder into three spaces, said pistons having rods protruding through the same end of the cylinder, the end spaces each containing a release spring resting on one end of the cylinder and on one of the pistons, and the central space containing an actuating oil inlet.

It will be easier to understand the invention will be more fully understood from the following description of one embodiment thereof, which is illustrated by the accompanying drawings.

FIG. 5 is a cross-section of the system in FIG. 4, perpendicular to the valve passage.

FIG. 6 is a longitudinal cross-section of a modified single-jack system.

Figure 1:
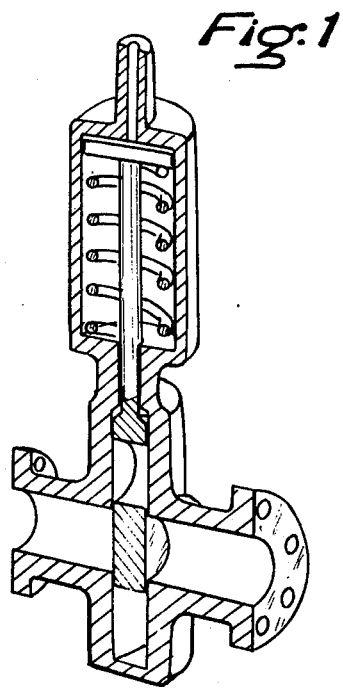
FIG. 1 shows a conventional gate-valve.
Figure 2A:
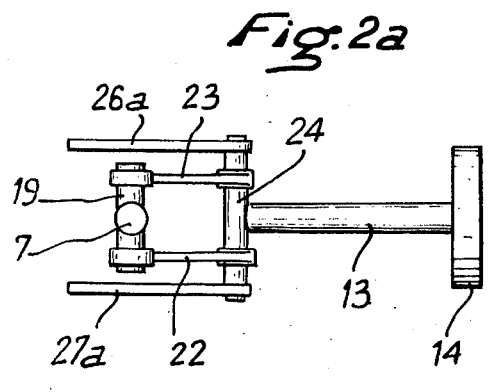
FIG. 2 is a longitudinal cross-section of a system with two symmetrical jacks.
Figure 2:
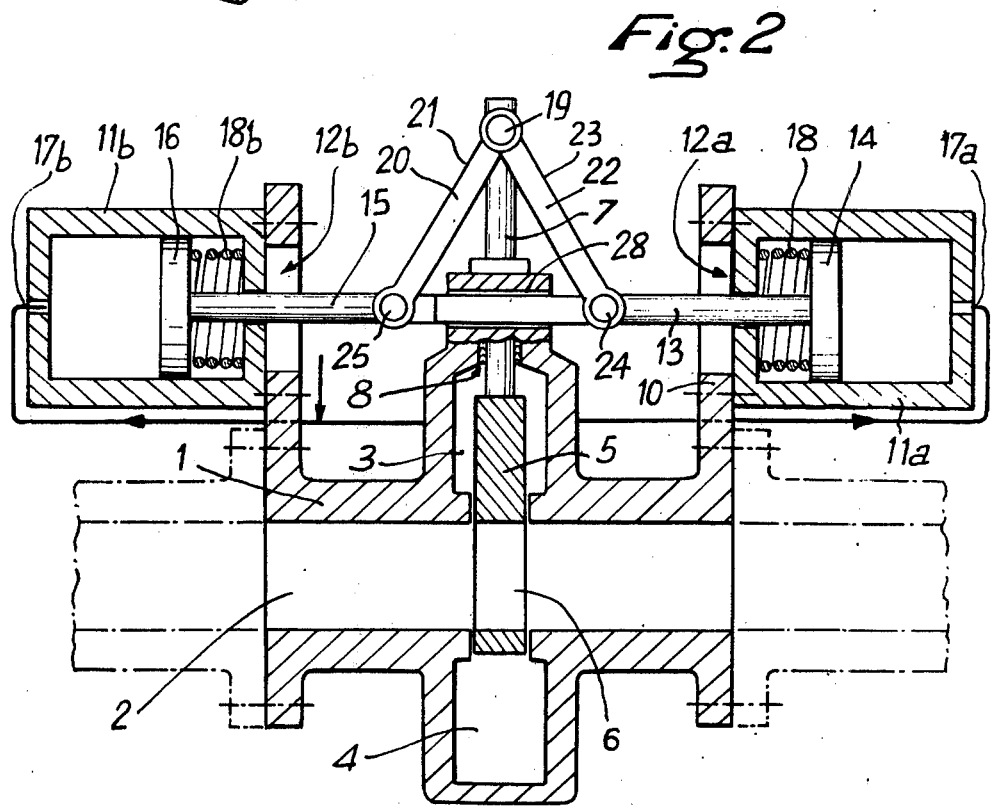

FIG. 2 shows a longitudinal cross-section of a system with two symmetrical jacks. It shows a gate-valve casing 1, with a passage 2 aligned with the pipes provided on each side of the valve. The valve casing contains cavities 3 and 4, within which moves a gate 5, having a circular aperture 6 of the same section as the inside passage of the valve, and with an operating gate-rod 7, which passes through an aperture 8.

Bolted to the end plates 9 and 10 of the valve casing are the jacks 11a and 11b. A rod 13, attached to piston 14, projects through the end 12a of jack 11a, in the direction of the valve, while rod 15, attached to piston 16, projects through the end 12b of jack 11b, also in the direction of the valve. These pistons are symmetrically located in relation to the vertical axis of the gate member 5.

Each piston divides the jack cylinder into two spaces, one containing an oil inlet 17a or 17b, and the other a release spring, 18a or 18b, one end of which rests on the cylinder base, while the other rests on the piston.

Each of the piston-rods is connected to the gate-rod 7 by means of pairs of connecting-rods 20 and 21, and 22 and 23, which are of equal length and symmetrical in relation to the gate-rod, each pair being hinged on a short axle 19, perpendicular to the plane defined by the gate and piston axes, this short axle being attached to the upper end of the gate-rod, and the other ends of the pairs of connecting-rods being hinged on two axles 24 and 25, parallel to the short axis, and each attached to the end of one of the two-piston-rods. The pairs of connecting-rods are also at equal angles to the gate-rod axis, on opposite sides of it. Parallel bars 26a and 27a project from the piston rods, being attached to the axles 24 and 25, and guided by slide ways or passages 28 and 29, which are attached to the valve casing, on each side of the opening 8 through which the gate-rod passes.

FIG. 2a shows the piston 14 viewed from above, with its rod 13, the end of which is fixed to the middle of an axle 24. Two bars 26a and 27a are attached to the ends of this axle 24, parallel to the piston-rod, and guided by slide passages, not shown in this figure. Two equal and parallel connecting-rods 22 and 23 are hinged on the axle 24, the other ends being hinged on the short axle 19, which is attached, in turn, to the upper end of the rod 7.

Figure 3:
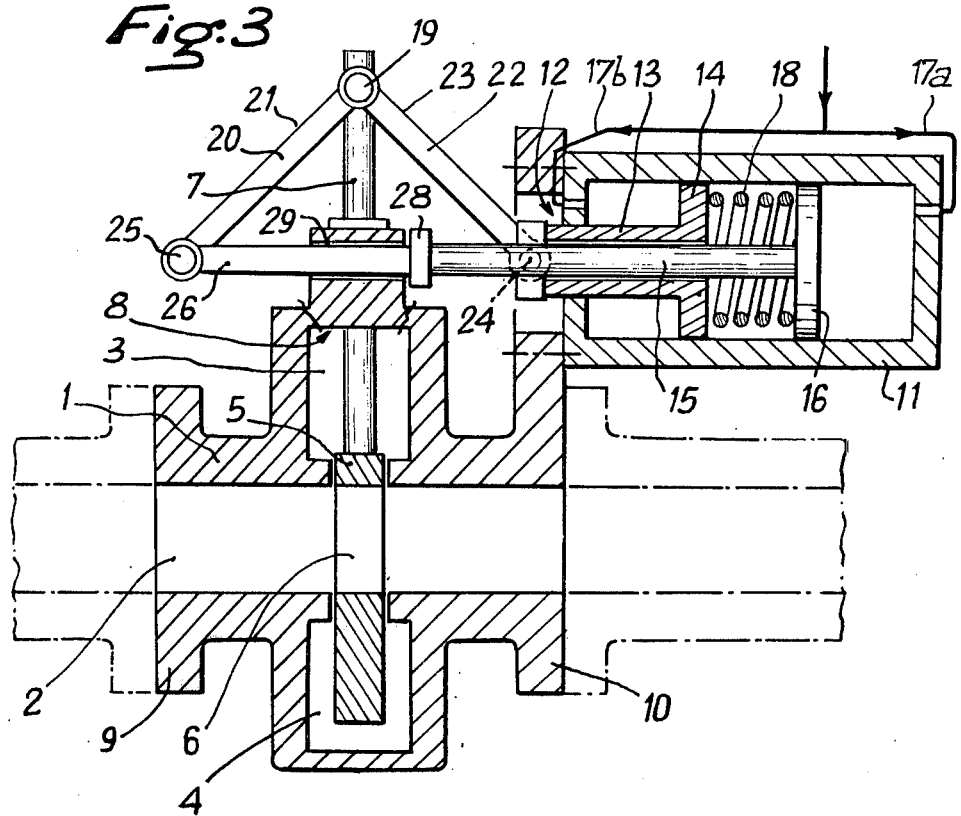
FIG. 3 is a longitudinal cross-section of a single-jack system.

FIG. 3 shows a longitudinal cross-section of a single-jack system. This system includes the same components as the system of FIG. 2, as far as the actual gate-valve is concerned. However, the control system comprises a single jack 11, having two pistons 14 and 16 which move together in opposite directions are located in symmetrical positions in relation to the median plane of the jack cylinder, and which divide the latter into three spaces. The two pistons have coaxial rods 13 and 15, which project through the same end of the cylinder.

Rod 13 of piston 14 is connected to connecting-rods 22 and 23 by means of the axle 24, perpendicular to rod 13, while rod 15 of piston 16 is connected to connecting-rods 20 and 27 by means of a bar 28 perpendicular to rod 15, two bars 26 and 27 parallel to rod 15, and an axle 25, parallel to the bar 28 and short axle 19.

The central space of the cylinder contains a release spring resting on the two pistons, while the end spaces each contain an actuating oil inlet.

Figure 4:
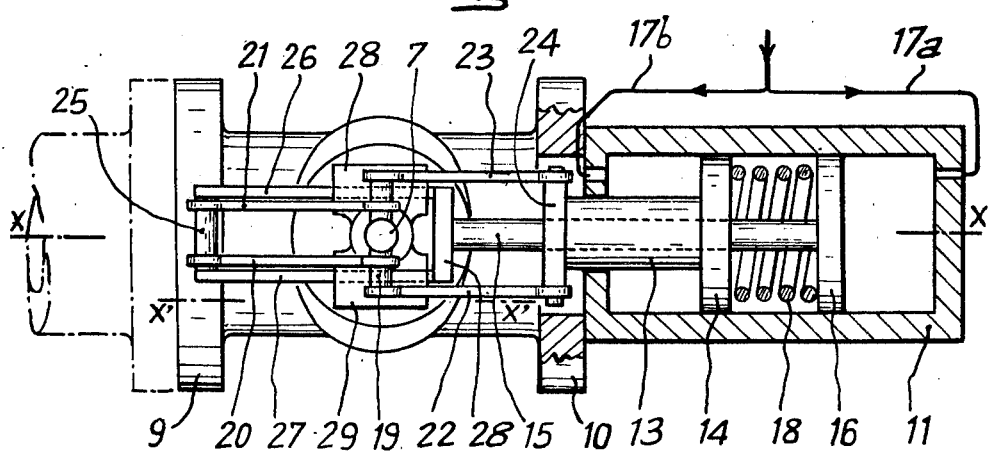
FIG. 4 shows a system with one jack, seen from above.

FIG. 4 shows the same components as FIG. 3, seen from above. The line X—X shows the plane on which most of the cross-sectional view in FIG. 3 is presented, while the upper part of the valve casing is shown along a section X'—X', allowing a cross-sectional view of the slide passage 29 to be shown on FIG. 3.

FIG. 4 shows the two pistons 14 and 16 which move together in opposite directions, and their coaxial rods 13 and 15, with rod 15 traversing piston 14 and its rod 13. Rod 13 of piston 14 is connected with the short axle 19 attached to the end of rod 7, by means of the bar 24 attached to the end of rod 13 and the equal connecting-rods 22 and 23, both hinged at one end on the short axle 19, and at the other end on the bar 24.

The rod 15 of piston 16 is connected through the same short axle 19 by means of the bar 28 attached to the end of rod 15, combined with two bars 26 and 27 parallel to rod 15, symmetrical to the vertical plane X–X', which traverses the slide passages 28 and 29 attached to the valve casing, these bars 26 and 27 being attached to the ends of bar 25, the position of which is symmetrical with the position of bar 24 in relation to rod 7, and by means of the equal connecting-rods 20 and 21, both hinged at one end to the short axle 19 and at the other end to the bar 25.

FIG. 5 shows a cross-section along a plane perpendicular to the valve-passage axis, and passing through the axis of the valve gate-rod, for a system as illustrated in FIGS. 3 and 4, namely with a single jack and single release spring between the two pistons. This cross-section shows the position of the slide passages 28 and 29 through which bars 26 and 27 pass.

FIG. 6 shows a horizontal cross-section of a single-jack system, with two pistons 14 and 16 dividing the jack cylinder into three spaces, of which the central space contains an oil inlet 17 and the two end spaces each contain a release spring, one end of which rests on a piston, with the other end resting on the cylinder base. The device transmitting the piston movement to the gate-rod is the same as in FIG. 3.

In valves of the three types illustrated here, or of any other type using similar mechanical means, the gate is kept in the closed position by the release spring or springs, when no pressure is applied by the control-fluid. When such pressure is applied, using the control-fluid, this causes displacement of the pistons, causing the gate to move to the open position, by transmission of movement at right angles. These are the precise conditions under which an automatic safety valve functions.

What is claimed is:

1. A device for operating an automatic safety gate valve comprising a valve member movable transversely of a valve passage and connected to a valve rod, said device including:
   valve actuating means comprising:
      two hydraulically controlled pistons mounted on piston rods with axes parallel to said valve passage, and movable between first and second positions, and
      means connecting each of said piston rods to the valve rod, which connecting means converts said movement of said pistons parallel to said valve passage into longitudinal movement of said valve rod transverse to said passage between valve-open and valve-closed positions, and
   means biassing said valve actuating means toward a position in which said valve is closed.

2. Device as claimed in claim 1 in which said connecting means comprise:
   a pivot pin having its axis perpendicular to a plane containing the axes of said piston rods and the axis of said passage, said pin being carried by said valve rod at a point spaced from said valve member,
   two pair of connecting rods, each pair being pivotally connected at one end to said pivot pin,
   two additional pivot pins having axes parallel to the axis of said first mentioned pivot pin, each carried by one of said piston rods and each connected to the other end of one of said pairs of connecting rods so that said connecting rods have axes lying at identical angles to the axis of said valve rod, and
   guide means aligned with said pistons in which the axes of said piston rods are guided in a path parallel to the axis of said passage.

3. Device as claimed in claim 2 in which both pistons lie in a single cylindrical chamber, and protrude through the same end of said chamber, said biassing means consists of springs between each end of said chamber and the nearest piston, and said pistons are spaced by a portion of said chamber connected to a source of fluid pressure.

4. A device as defined in claim 2, in which each piston lies inside a hydraulic cylinder, dividing the cylinder into two spaces, one comprising a control-oil inlet, and the other a release spring resting on an end of the cylinder and on the piston.

5. A device as defined in claim 2, in which both pistons lie inside a single hydraulic cylinder, occupying symmetrical positions in relation to the median plane of the cylinder, and dividing this cylinder into three spaces, the pistons being fitted with coaxial rods protruding through the same end of the cylinder, the central space containing a release spring resting on both pistons, and the two end spaces each comprising a control-oil inlet.

* * * * *

UNITED STATES PATENT OFFICE
CERTIFICATE OF CORRECTION

PATENT NO. : 4,029,289
DATED : June 14, 1977
INVENTOR(S) : HUBERT MIFFRE

It is certified that error appears in the above-identified patent and that said Letters Patent are hereby corrected as shown below:

[73] Assignee:  Entreprise de Recherches et D'Activities Petrolieres (E.R.A.P.)

Signed and Sealed this

First Day of November 1977

[SEAL]

Attest:

RUTH C. MASON  
*Attesting Officer*

LUTRELLE F. PARKER  
*Acting Commissioner of Patents and Trademarks*